(12) United States Patent
Sinton

(10) Patent No.: US 11,379,807 B2
(45) Date of Patent: *Jul. 5, 2022

(54) METHODS AND SYSTEMS FOR INITIATING A FINANCIAL TRANSACTION BY A CARDHOLDER DEVICE

(71) Applicant: MasterCard International Incorporated, Purchase, NY (US)

(72) Inventor: James Sinton, Essex (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 368 days.

This patent is subject to a terminal disclaimer.

(21) Appl. No.: 15/796,526

(22) Filed: Oct. 27, 2017

(65) Prior Publication Data

US 2018/0053166 A1 Feb. 22, 2018

Related U.S. Application Data

(63) Continuation of application No. 12/888,278, filed on Sep. 22, 2010, now Pat. No. 9,805,348.

(51) Int. Cl.
*G06Q 20/12* (2012.01)
*G06Q 20/40* (2012.01)
(Continued)

(52) U.S. Cl.
CPC ........... *G06Q 20/12* (2013.01); *G06Q 20/204* (2013.01); *G06Q 20/382* (2013.01);
(Continued)

(58) Field of Classification Search
CPC .. G06Q 40/02; G06Q 30/06; G06Q 20/40145; G06Q 20/382; G06Q 20/4016;
(Continued)

(56) References Cited

U.S. PATENT DOCUMENTS 5,898,777 A 4/1999 Tycksen, Jr. et al.
6,124,352 A 9/2000 Gurevich
(Continued)

OTHER PUBLICATIONS

Zhu, Yunpu. A new architecture for secure two-party mobile payment transactions. University of Lethbridge (Canada). ProQuest Dissertations Publishing, 2010. (Year: 2010).*
(Continued)

*Primary Examiner* — Dennis W Ruhl
*Assistant Examiner* — Fawaad Haider
(74) *Attorney, Agent, or Firm* — Armstrong Teasdale LLP

(57) ABSTRACT

A method and system for processing a financial transaction initiated by a cardholder with a merchant. The cardholder initiates the transaction using a cardholder input device and transmits an authorization request message including transaction data received by the cardholder input device from a point of sale (POS) device associated with the merchant. The authorization request message is received by a computer system. The transaction data is validated, and an authorization response message is transmitted after validation. The cardholder input device may forward the authorization response message to the POS device for completing the transaction.

13 Claims, 12 Drawing Sheets

(51) Int. Cl.
  *G06Q 20/38*   (2012.01)
  *G06Q 20/20*   (2012.01)
  *G06Q 30/06*   (2012.01)
  *G06Q 40/02*   (2012.01)

(52) U.S. Cl.
  CPC ......... *G06Q 20/405* (2013.01); *G06Q 20/409* (2013.01); *G06Q 20/4016* (2013.01); *G06Q 20/40145* (2013.01); *G06Q 30/06* (2013.01); *G06Q 40/02* (2013.01)

(58) Field of Classification Search
  CPC .... G06Q 20/405; G06Q 20/322; G06Q 20/12; G06Q 20/204; G06Q 20/409
  USPC .......................................................... 705/17
  See application file for complete search history.

(56) References Cited

U.S. PATENT DOCUMENTS

| | | |
|---|---|---|
| 6,704,714 B1 | 3/2004 | O'Leary et al. |
| 7,031,733 B2 | 4/2006 | Alminana et al. |
| 7,076,329 B1 | 7/2006 | Kolls |
| 7,127,264 B2 | 10/2006 | Hronek et al. |
| 7,245,905 B2 | 7/2007 | Kamdar et al. |
| 7,251,495 B2 | 7/2007 | Keyani et al. |
| 7,784,684 B2 | 8/2010 | Labrou et al. |
| 2001/0037264 A1 | 11/2001 | Husemann et al. |
| 2002/0174121 A1 | 11/2002 | Clemie |
| 2003/0065615 A1 | 4/2003 | Aschir |
| 2003/0139174 A1 | 7/2003 | Rao |
| 2003/0171993 A1 | 9/2003 | Chappuis |
| 2003/0212601 A1 | 11/2003 | Silva et al. |
| 2004/0019564 A1 | 1/2004 | Goldthwaite et al. |
| 2004/0214597 A1 | 10/2004 | Suryanarayana et al. |
| 2005/0144020 A1 | 6/2005 | Muzaffar et al. |
| 2005/0238149 A1 | 10/2005 | De Leon |
| 2005/0240526 A1 | 10/2005 | Hill |
| 2006/0080232 A1 | 4/2006 | Epps |
| 2006/0149644 A1 | 7/2006 | Sulmar et al. |
| 2006/0229978 A1* | 10/2006 | Popovic ................. G06Q 20/10 705/39 |
| 2006/0253339 A1 | 11/2006 | Singh et al. |
| 2007/0094135 A1 | 4/2007 | Moore et al. |
| 2007/0100651 A1 | 5/2007 | Ramer et al. |
| 2007/0100691 A1* | 5/2007 | Patterson ........... G06Q 30/0211 705/14.14 |
| 2007/0106564 A1 | 5/2007 | Matotek et al. |
| 2007/0203836 A1 | 8/2007 | Dodin |
| 2007/0213991 A1 | 9/2007 | Bramante |
| 2007/0233615 A1 | 10/2007 | Tumminaro |
| 2007/0255620 A1 | 11/2007 | Tumminaro et al. |
| 2007/0255652 A1 | 11/2007 | Tumminaro et al. |
| 2007/0255653 A1 | 11/2007 | Tumminaro et al. |
| 2008/0033793 A1 | 2/2008 | Roberts |
| 2008/0048025 A1 | 2/2008 | Fitzgerald et al. |
| 2008/0091616 A1 | 4/2008 | Helwin et al. |
| 2008/0319905 A1* | 12/2008 | Carlson .................. G06Q 20/40 235/379 |
| 2009/0065571 A1 | 3/2009 | Jain |
| 2009/0065572 A1 | 3/2009 | Jain |
| 2009/0069049 A1 | 3/2009 | Jain |
| 2009/0070272 A1 | 3/2009 | Jain |
| 2009/0171845 A1 | 7/2009 | Powell |
| 2010/0088188 A1 | 4/2010 | Kumar et al. |
| 2010/0174620 A1* | 7/2010 | Stringfellow ........ G06Q 20/227 705/26.1 |
| 2011/0166914 A1 | 7/2011 | Dixon et al. |
| 2011/0225094 A1* | 9/2011 | Hammad ............... G06Q 20/40 705/75 |
| 2011/0251910 A1* | 10/2011 | Dimmick ............. G06Q 20/322 705/17 |

OTHER PUBLICATIONS

Zhu, Yunpu. A new architecture for secure two-party mobile payment transactions. University of Lethbridge (Canada), ProQuest Dissertations Publishing, 2010.

* cited by examiner

## METHODS AND SYSTEMS FOR INITIATING A FINANCIAL TRANSACTION BY A CARDHOLDER DEVICE

CROSS REFERENCE TO RELATED APPLICATIONS

This application is a continuation application of U.S. patent application Ser. No. 12/888,278, filed Sep. 22, 2010, entitled "METHODS AND SYSTEMS FOR INITIATING A FINANCIAL TRANSACTION BY A CARDHOLDER DEVICE", the disclosure of which is hereby incorporated herein by reference in its entirety.

BACKGROUND OF THE INVENTION

This invention relates generally to processing transactions associated with financial transaction card accounts and, more particularly, to network-based methods and systems for processing payment card transactions initiated by a cardholder using a cardholder controlled input device.

Historically, the use of "charge" cards for consumer transaction payments was at most regional and based on relationships between local credit issuing banks and various local merchants. The payment card industry has since evolved with the issuing banks forming associations (e.g., MasterCard®) and involving third party transaction processing companies (e.g., "Merchant Acquirers") to enable cardholders to widely use charge cards at any merchant's establishment, regardless of the merchant's banking relationship with the card issuer.

For example, FIGS. 1 and 2 of the present application show exemplary payment-by-card systems. FIG. 1 shows an exemplary private label payment card system, and FIG. 2 shows an exemplary multi-party payment card industry system for enabling payment-by-card transactions in which the merchants and issuer do not need to have a one-to-one special relationship. Various scenarios exist in the payment-by-card industry today, where the card issuer has a special or customized relationship with a specific merchant, or group of merchants. These special or customized relationships may, for example, include private label programs, co-brand programs, proprietary card brands, rewards programs, and others. The special or customized issuer-merchant relationships often require direct communications between the parties for transaction authorization and/or clearing (e.g., for financial transactions). Further, the issuer may be required to maintain back office processes to manage the financial aspects of these special or customized relationships. Alternatively, the issuers may exploit communications through merchant acquirers to facilitate indirect communications with the merchants.

There are also scenarios in the payment-by-card industry where the card issuer does not have a special or customized relationship with a specific merchant, or group of merchants. These types of transactions are typically processed using a multi-party payment card system similar to the one shown in FIG. 2.

Traditional card account payment environments involve a merchant-controlled point of interaction (POI). Traditional points of interaction include point of sale devices, access through a merchant website, and interaction through a merchant telephone to initiate the authorization request. Collectively, these traditional points of interaction might be referred to as a merchant environment. For all interactions within this environment, an account number associated with a cardholder's financial transaction card is entered into the specific merchant's environment in order to conduct the transaction and/or obtain an authorization.

The specific cardholder interactions could include the cardholder giving his financial transaction card to a merchant to swipe or key into the merchant point of sale device, the merchant initiating a telephone call and entering the account number through interactive voice or through the telephone keypad, the cardholder himself swiping his card into the merchant's point of sale device, or the merchant or cardholder entering the account number into the merchant's website. Payments for approved transactions are managed with the issuer or merchant's acquirer based on the specific card payment network or closed loop environment.

One problem with the merchant environment is that the card and the account number are exposed to potential fraud. Though various security features for the card and account number are used, a more secure environment is needed. Consideration is now being given to ways to enable account holders to utilize their accounts remotely from the above listed devices, such that the account holder can initiate or "push" transactions which are then processed over the bankcard network without a merchant-controlled POI.

Another problem with the merchant environment is the cost associated with the merchant having to communicate with the issuer, the merchant acquirer and/or the payment card network. These costs include costs for both equipment and data transmission. In some cases, merchants are not able to afford these costs, and therefore, these merchants are unable to take advantage of the payment-by-card systems. In other cases, the merchants may be able to afford the upfront equipment costs and/or data transmission costs for each transaction being processed, but are required to pass these costs on to their customers. In some cases, these costs may be passed on to customers that do not even utilize the payment-by-card system. Further, in some cases, a merchant may wish to accept payment cards but lack the capacity, for a variety of reasons, to connect to the payment card network.

Accordingly, it would be beneficial to have a payment-by-card system that allows the cardholders to initiate a transaction using a cardholder controlled input device for a variety of reasons including improved security and reduced merchant costs. Such a system would allow a merchant to reduce its upfront equipment costs and its data transmission costs since the cardholder input device would be utilized for performing at least part of the transaction.

BRIEF DESCRIPTION OF THE INVENTION

In one embodiment, a computer-based method for processing a financial transaction initiated by a cardholder with a merchant is provided. The cardholder initiates the transaction using a cardholder input device, and the cardholder input device stores account data that is associated with a payment account. An issuer associates the payment account with the cardholder. The method includes receiving, at the issuer, an authorization request message relating to the transaction. The authorization request message is transmitted by the cardholder input device and includes transaction data received by the cardholder input device from a point of sale (POS) device associated with the merchant. The transaction data is validated, and an approved authorization response message is transmitted after validation. The cardholder input device forwards the approved authorization response message to the POS device for completing the transaction.

In another embodiment, a device for processing a financial transaction is provided. The device includes a memory device configured to store account data associated with a cardholder, a communication interface configured to receive transaction data from a point of sale (POS) device associated with a merchant, and a processor that is coupled to the memory device and the communication interface. The processor is programmed to transmit an authorization request message relating to the transaction to a computer system via the communication interface. The authorization request message includes the transaction data and the account data.

In another embodiment, a computer-based method for processing a financial transaction initiated by a cardholder via a cardholder input device is provided. The method includes receiving from the cardholder input device an authorization request message relating to the transaction. The authorization request message includes transaction data received by the cardholder input device from a point of sale (POS) device associated with a merchant. The transaction data is validated, and when the transaction data is successfully validated, an approved authorization response message is transmitted to the cardholder input device. The cardholder input device forwards the approved authorization response message to the POS device.

In another embodiment, a system for processing a financial transaction initiated by a cardholder with a merchant is provided. The system includes a point of sale (POS) device associated with the merchant and a computer device. The POS device is configured to transmit transaction data to a cardholder input device associated with the cardholder. The transaction data relates to the financial transaction. The computer device is configured to receive an authorization request message including the transaction data directly from the cardholder input device. The computer device is also configured to validate the transaction data and to transmit directly to the cardholder input device an authorization response message indicating whether the transaction data was successfully validated.

In another embodiment, one or more computer-readable media having computer-executable instructions embodied thereon are provided. When executed by a computer device, the computer-executable instructions cause the computer device to initiate a financial transaction with a point of sale (POS) device associated with a merchant; to receive transaction data relating to the financial transaction from the POS device; to transmit to a remote computer an authorization request message that includes the received transaction data and account data stored at the computer device; to receive an approved authorization response message from the remote computer; and to forward the approved authorization response message to the POS device.

BRIEF DESCRIPTION OF THE DRAWINGS

FIG. 1 is a schematic diagram of an exemplary private label card account payment environment that includes a point of interaction controlled by a private label merchant, a card issuer or issuing bank, and a transaction processor interconnecting the point of interaction and card issuer.

FIG. 2 is a schematic diagram illustrating an exemplary multi-party payment card industry system for enabling ordinary payment-by-card transactions in which merchants and card issuers do not necessarily have a one-to-one relationship.

FIG. 3 is a simplified block diagram of an exemplary payment card system in accordance with one embodiment of the present invention.

FIG. 4 is an expanded block diagram of an exemplary embodiment of a server architecture of a payment card system in accordance with one embodiment of the present invention.

FIG. 5 is a block diagram of an exemplary embodiment of a user computer device as shown in FIGS. 3 and 4.

FIG. 6 is a block diagram of an exemplary embodiment of a server computer device as shown in FIGS. 3 and 4.

FIG. 7 is a block diagram of a portion of an exemplary payment card system showing an authentication data flow between a merchant POS device, a cardholder input device, and a payment network.

FIG. 8 is a block diagram of a portion of an exemplary payment card system showing a first alternative authentication data flow between a merchant POS device, a cardholder input device, and a payment network.

FIG. 9 is a block diagram of an exemplary payment card system showing a second alternative authentication data flow between a merchant POS device, a cardholder input device, a payment network, an issuing bank, and an acquiring bank.

FIG. 10 is a more detailed block diagram of an exemplary payment card system showing a payment data flow between a merchant POS device, a cardholder input device, an issuing bank computer system, a payment network and a merchant bank account.

FIG. 11 is a more detailed block diagram of the exemplary payment card system shown in FIG. 8 showing a first alternative payment data flow between a merchant POS device, a cardholder input device, an issuing bank computer system, a payment network, an acquiring bank computer system, and a merchant bank account.

FIG. 12 is a more detailed block diagram of the exemplary payment card system shown in FIG. 9 showing a second alternative payment data flow between a merchant POS device, a cardholder input device, an issuing bank computer system, a payment network, an acquiring bank computer system, and a merchant bank account.

DETAILED DESCRIPTION OF THE INVENTION

Embodiments of the methods and systems described herein facilitate communication of transaction data from a point of sale (POS) device associated with a merchant to a remote computer system associated with a payment network, an acquiring bank, and/or an issuing bank via a cardholder device. In some embodiments, the cardholder device initiates a transaction with the POS device, receives data from the POS device, and transmits an authorization request message including data from both the POS device and the cardholder device to the remote computer system. The remote computer system validates the data and, upon a successful validation, transmits an approved authorization response message to the cardholder device. The cardholder device may forward the approved authorization response message to the POS device to complete the transaction.

By using the wireless communication link of the cardholder device, the merchant is able to reduce its hardware and transmission costs that are typically associated with a payment by card transaction. In addition, the transmission by the cardholder device may reduce certain security concerns with providing an account number to a merchant.

The following detailed description illustrates embodiments of the invention by way of example and not by way of limitation. It is contemplated that the invention has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effects may include at least one of: a) transaction data is received from a point of sale (POS) device by a cardholder device; b) an authorization request message including the transaction data is transmitted by the cardholder device to a computer system associated with a payment network, an issuing bank, and/or an acquiring bank; c) the transaction data is validated; d) upon successful validation, an approved authorization response message is transmitted by the computer system to the cardholder device; and e) the cardholder device forwards the approved authorization response message to the POS device.

Figure 1:
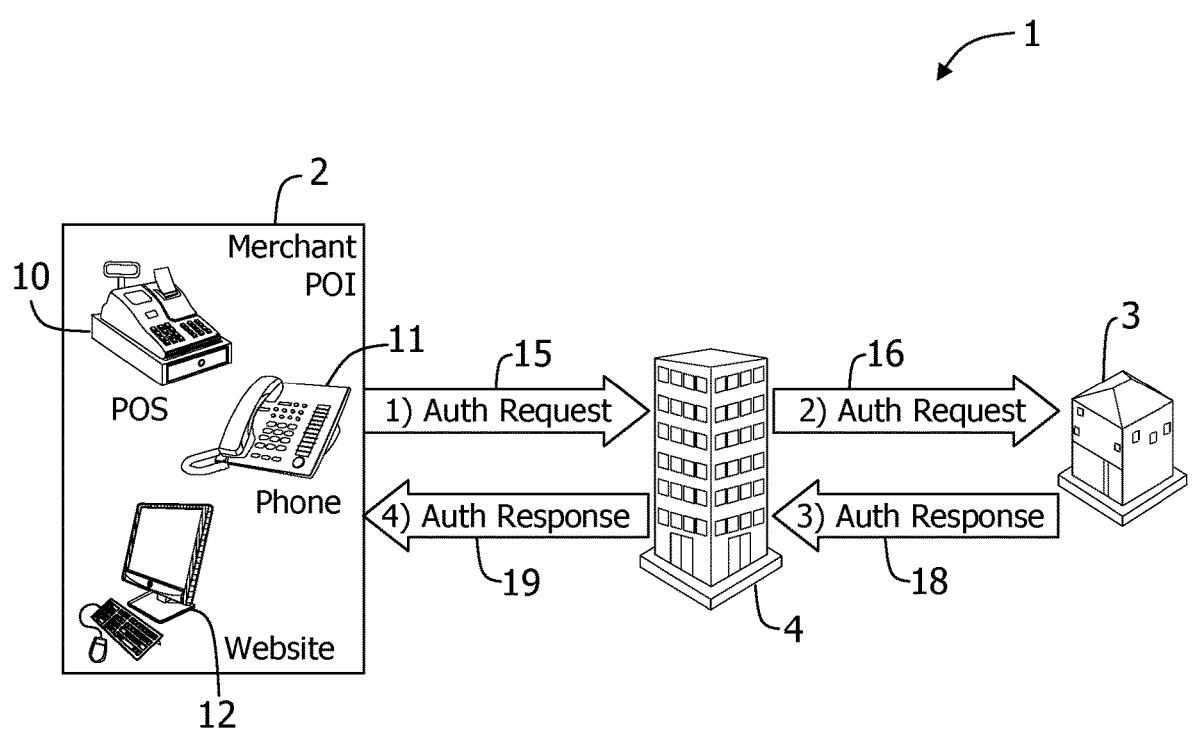
FIGS. 1-12 show exemplary embodiments of the methods and systems described herein.

FIG. 1 is a schematic diagram of an exemplary private label card account payment environment 1 that includes a point of interaction 2 controlled by a private label merchant, a card issuer or issuing bank 3, and a transaction processor 4 interconnecting point of interaction 2 and card issuer 3. The merchant's point of interaction 2 generally includes one or more of a point of sale device 10, a telephone 11, and/or a merchant website 12, through which authorization requests are initiated.

More specifically, a merchant authorization request 15 is generated at the merchant's point of interaction 2 which is sent to the transaction processor 4 and forwarded to the card issuer 3 as a request for authorization 16. Upon verifying a status of the cardholder account, the card issuer 3 responds to the transaction processor 4 with an authorization response 18 which is received by the transaction processor 4 and forwarded to the merchant's point of interaction 2 as an authorization response to merchant 19.

In regard to the card account payment environment 1, a cardholder's account number is entered into the merchant's environment with which the cardholder is doing business, in order to obtain the authorization. As described above, this conventionally includes one or more of the following: a cardholder giving his card to a merchant to swipe or key into the merchant point of sale device 10, the cardholder or merchant initiating a phone call from telephone 11 to enter a card account number, the cardholder himself swiping his card in the merchant's point of sale device 10, or the merchant or cardholder entering the account number associated with the financial transaction card into the merchant's website 12. Payments for approved transactions are managed with the card issuer 3 or merchant's acquirer (not shown in FIG. 1) based on the specific card payment network or other closed-loop environment. In the exemplary embodiment, private label card account payment environment 1 generally includes point of interaction 2, card issuer 3, and transaction processor 4 in a closed communication network such that authorization requests 15 and 16 remain within private label card account payment environment 1 and authorization responses 18 and 19 also remain within private label card account payment environment 1.

Figure 2:
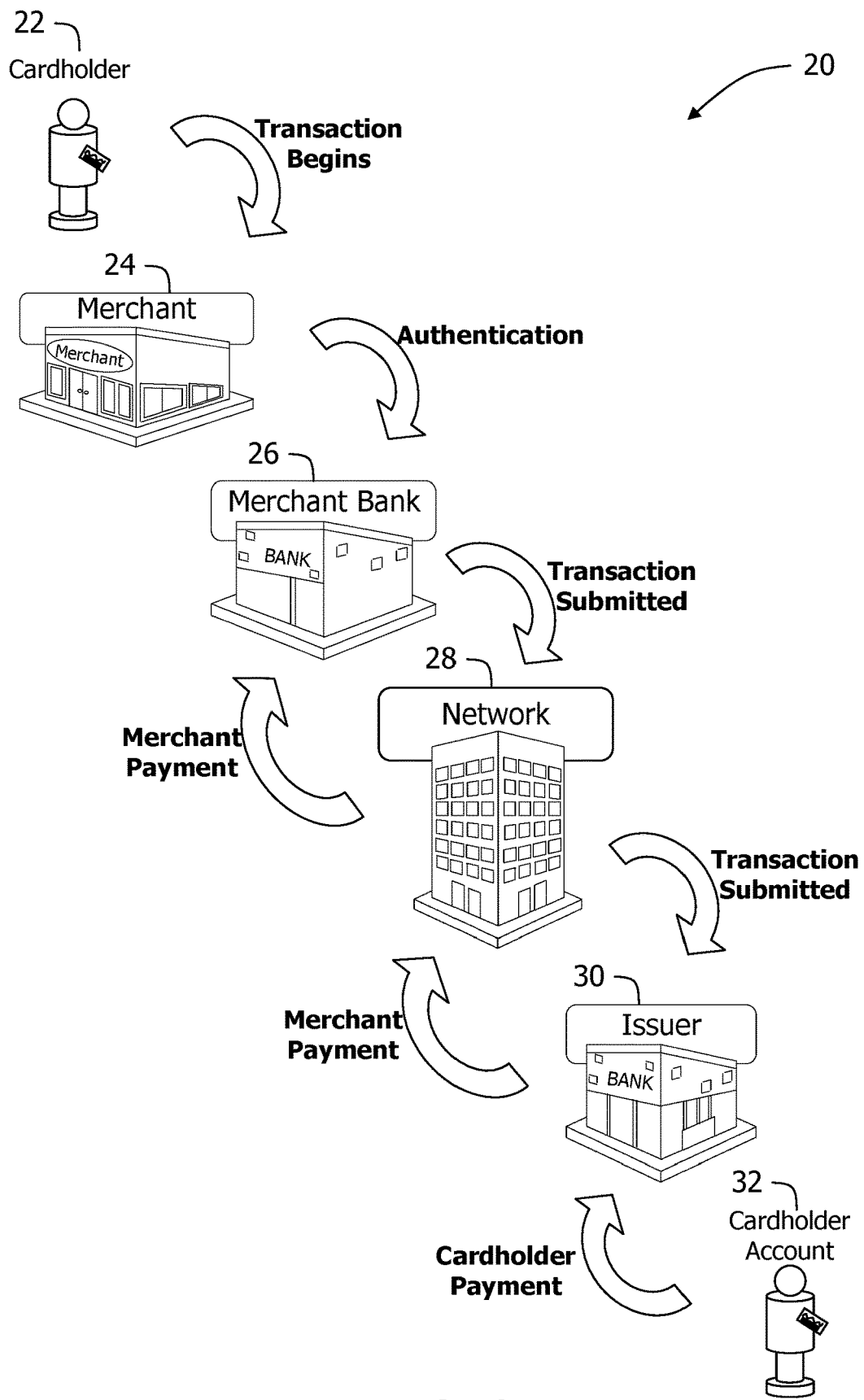

FIG. 2 is a schematic diagram 20 illustrating an exemplary multi-party payment card industry system for enabling ordinary payment-by-card transactions in which merchants and card issuers do not necessarily have a one-to-one relationship. The present invention relates to a payment card system, such as a credit card payment system using the MasterCard® interchange. The MasterCard® interchange is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In a typical payment card system, a financial institution called the "issuer" issues a payment card, such as a credit card, to a consumer, who uses the payment card to tender payment for a purchase from a merchant. To accept payment with the payment card, the merchant must normally establish an account with a financial institution that is part of the financial payment system. This financial institution is usually called the "merchant bank" or the "acquiring bank" or "acquirer bank." When a consumer 22 tenders payment for a purchase with a payment card (also known as a financial transaction card), the merchant 24 requests authorization from the merchant bank 26 for the amount of the purchase. The request may be performed over the telephone, but is usually performed through the use of a point-of-sale terminal, which reads the consumer's account information from the magnetic stripe on the payment card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor."

Using the interchange 28, the computers of the merchant bank or the merchant processor will communicate with the computers of the issuer bank 30 to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account 32 is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account 32 is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

Financial transaction cards or payment cards can refer to credit cards, debit cards, and prepaid cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Figure 3:
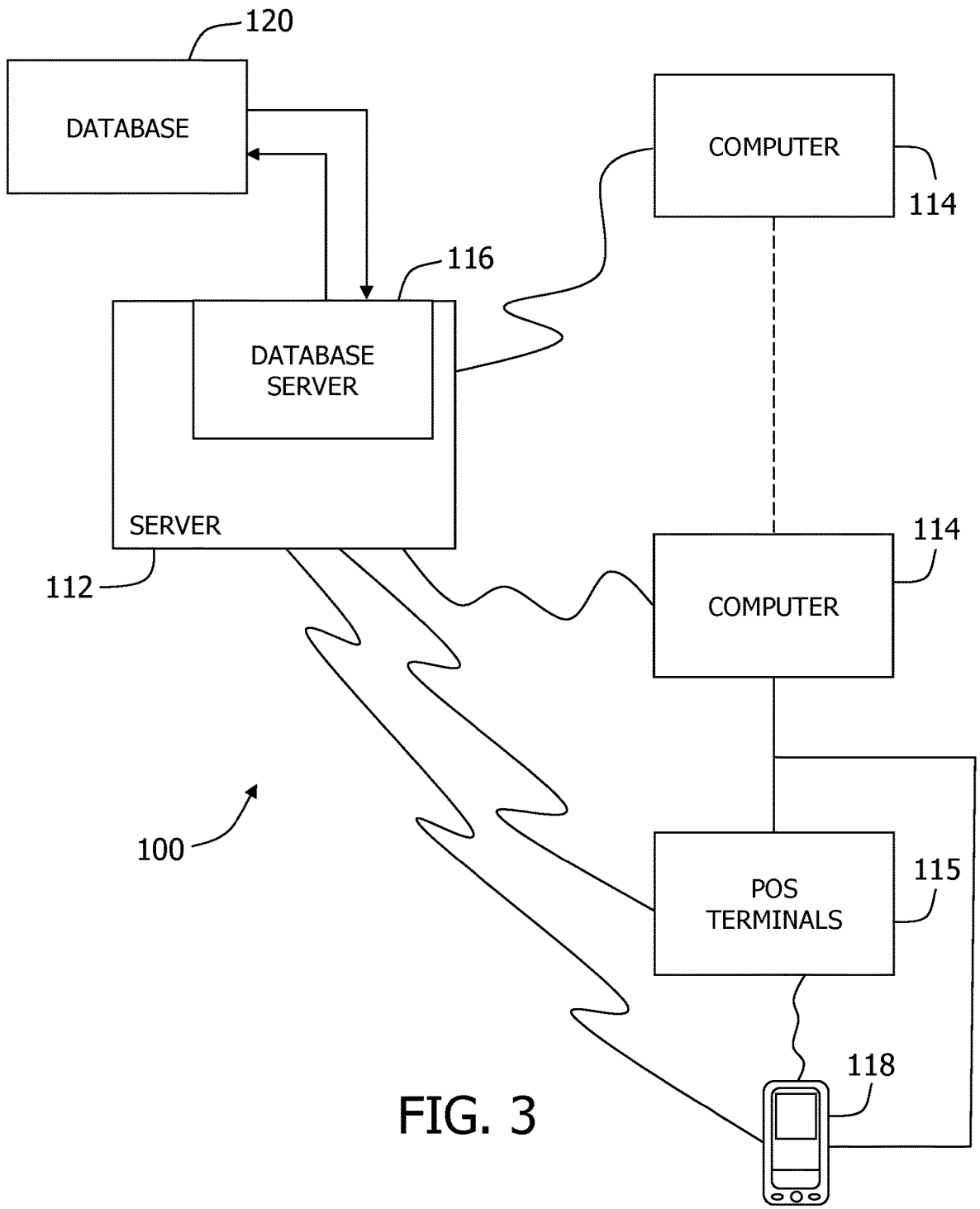

FIG. 3 is a simplified block diagram of an exemplary payment card system 100 in accordance with one embodiment of the present invention. System 100 is a payment card system, which can be utilized by account holders as part of a process of initiating an authorization request and performing a transaction as described below.

More specifically, in the example embodiment, system 100 includes a server system 112, which is a type of computer system, and a plurality of client sub-systems (also referred to as client systems 114) connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed ISDN lines. Client systems 114 could be any device capable of interconnecting to the Internet including a web-based phone, personal digital assistant (PDA), or other web-based connectable equipment.

System 100 also includes point-of-sale (POS) terminals 115, which are connected to client systems 114 and may be connected to server system 112. POS terminals 115 are interconnected to the Internet through many interfaces including a network, such as a local area network (LAN) or a wide area network (WAN), dial-in-connections, cable modems, wireless modems, and special high-speed ISDN lines. POS terminals 115 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized. Database 120 may store transaction data generated as part of sales activities conducted over the bankcard network including data relating to merchants, account holders or customers, and purchases. Database 120 may also store account data including at least one of a cardholder name, a cardholder address, an account number, and other account identifier. Database 120 may also store merchant data including a merchant identifier that identifies each merchant registered to use the payment card network, and instructions for settling transactions including merchant bank account information.

System 100 also includes at least one input device 118, which is configured to communicate with at least one of POS terminal 115, client systems 114 and server system 112. In the exemplary embodiment, input device 118 is associated with or controlled by a cardholder making a purchase using a payment card and payment card system 100. Input device 118 is interconnected to the Internet through many interfaces including a network, such as a local area network (LAN) or a wide area network (WAN), dial-in-connections, cable modems, wireless modems, and special high-speed ISDN lines. Input device 118 could be any device capable of interconnecting to the Internet including a web-based phone, personal digital assistant (PDA), or other web-based connectable equipment. Input device 118 is configured to communicate with POS terminal 115 using various outputs including, for example, Bluetooth communication, radio frequency communication, near field communication, network-based communication, and the like.

In the example embodiment, one of client systems 114 may be associated with an acquirer while another one of client systems 114 may be associated with an issuer, POS terminal 115 may be associated with a merchant, input device may be associated with a cardholder, and server system 112 may be associated with the interchange network.

Figure 4:
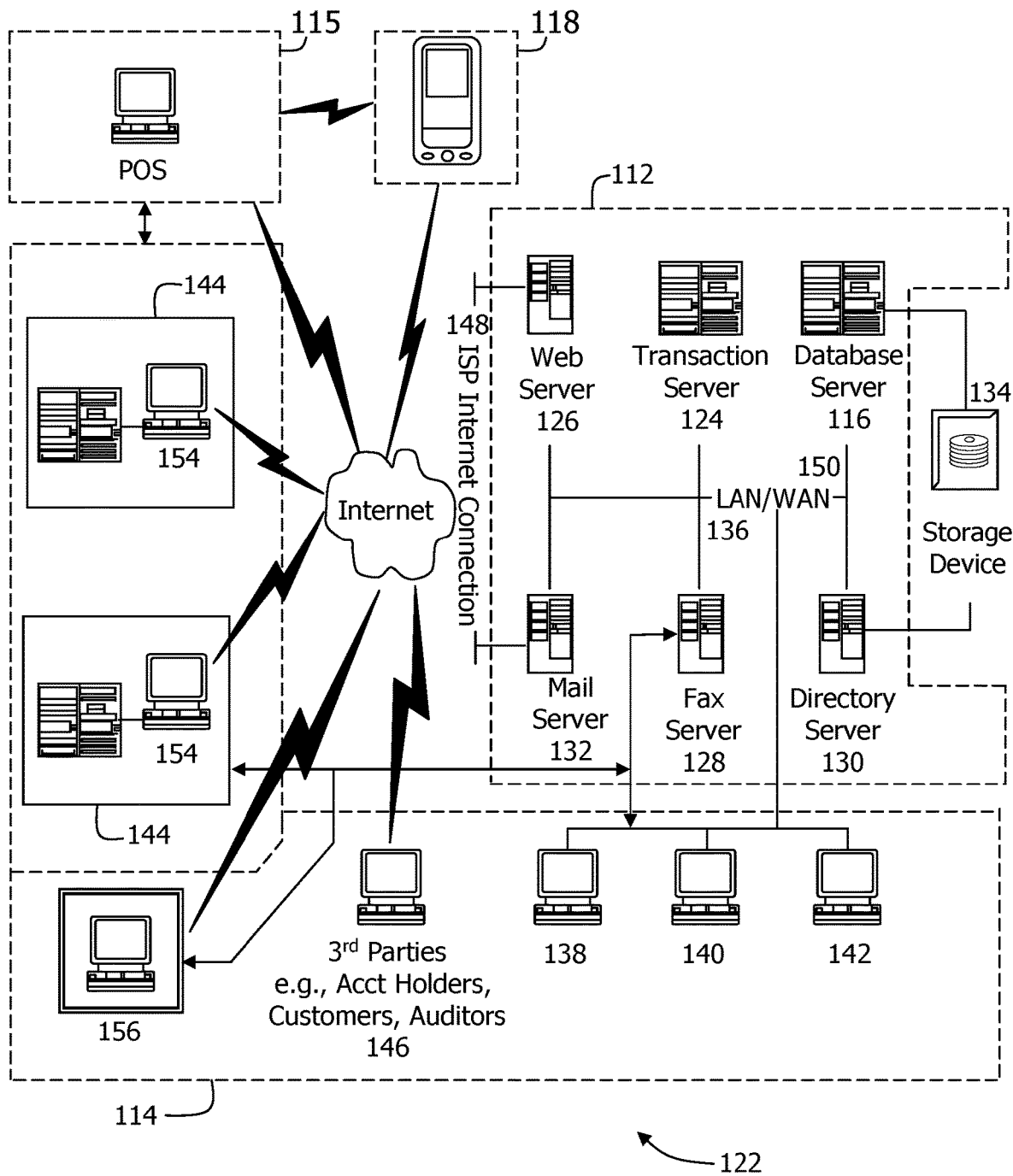

FIG. 4 is an expanded block diagram of an exemplary embodiment of a server architecture of a payment card system 122 in accordance with one embodiment of the present invention. Components in system 122, identical to components of system 100 (shown in FIG. 3), are identified in FIG. 4 using the same reference numerals as used in FIG. 3. System 122 includes server system 112, client systems 114, POS terminals 115, and input devices 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 5:
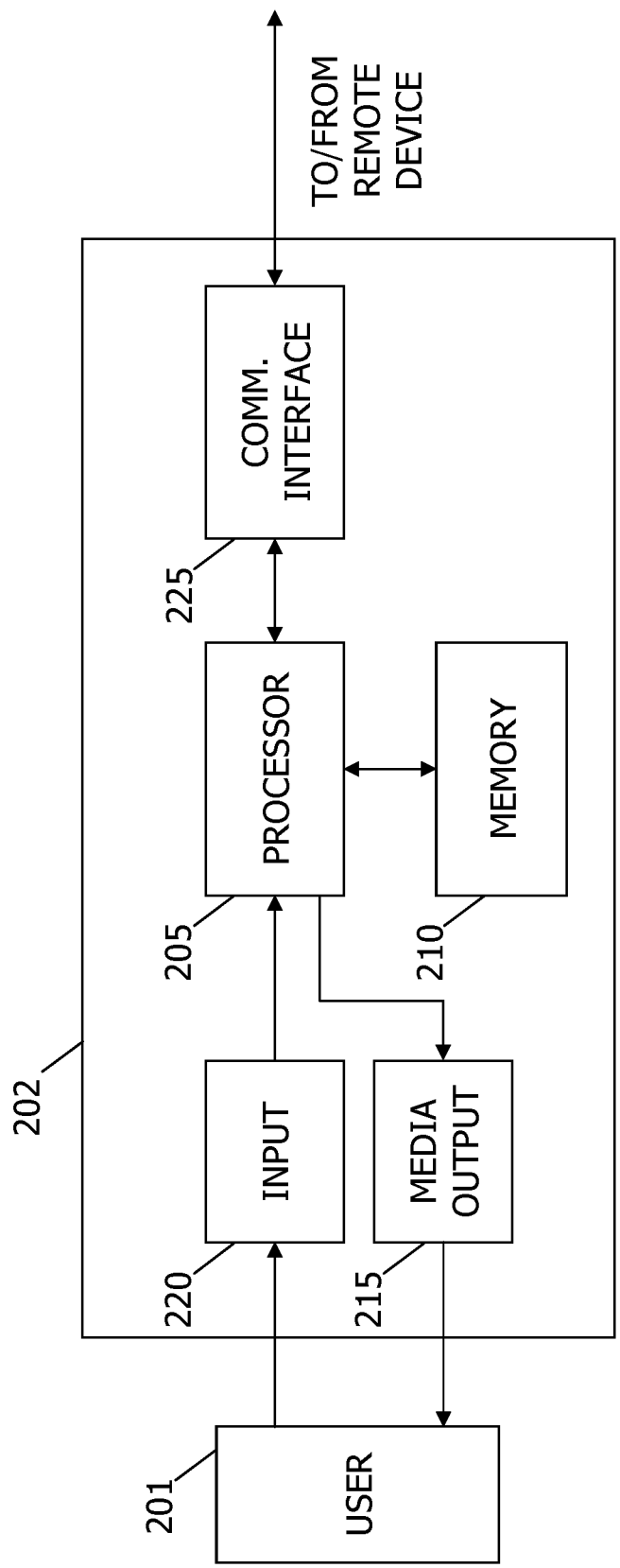

FIG. 5 illustrates an exemplary configuration of a user computer device 202 operated by a user 201. User computer device 202 may include, but is not limited to, client systems 114, 138, 140, and 142, POS terminal 115, input device 118, workstation 154, and manager workstation 156 (shown in FIG. 4).

User computer device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer readable media.

User computer device 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, user computer device 202 includes an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

User computer device 202 may also include a communication interface 225, which is communicatively couplable to a remote device such as server system 112. Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 6:
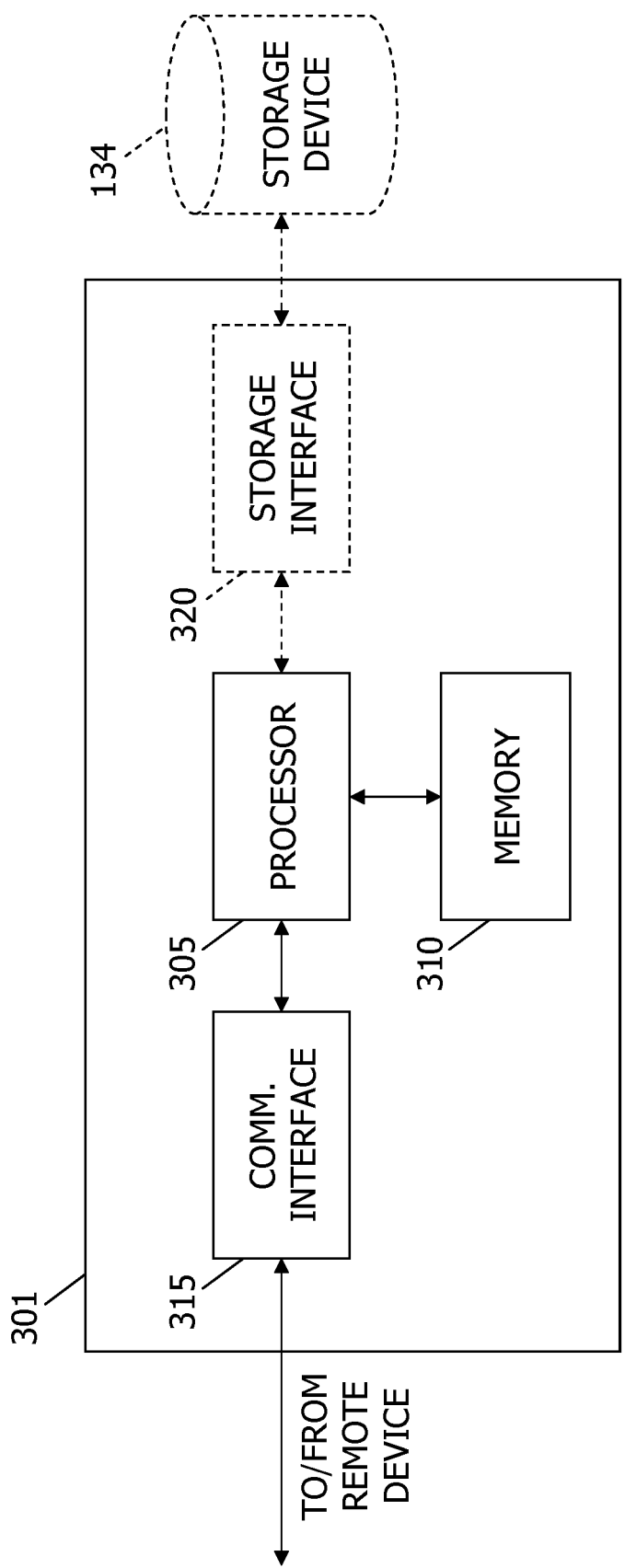

FIG. 6 illustrates an exemplary configuration of a server computer device 301 such as server system 112 (shown in FIGS. 3 and 4). Server computer device 301 may include, but is not limited to, database server 116, transaction server 124, web server 126, fax server 128, directory server 130, and mail server 132.

Server computer device 301 includes a processor 305 for executing instructions. Instructions may be stored in a memory area 310, for example. Processor 305 may include one or more processing units (e.g., in a multi-core configuration).

Processor 305 is operatively coupled to a communication interface 315 such that server computer device 301 is capable of communicating with a remote device such as user computer device 202 or another server computer device 301. For example, communication interface 315 may receive requests from user computer device 114 or input device 118 via the Internet, as illustrated in FIGS. 3 and 4.

Processor 305 may also be operatively coupled to a storage device 134. Storage device 134 is any computer-operated hardware suitable for storing and/or retrieving data. In some embodiments, storage device 134 is integrated in server computer device 301. For example, server computer device 301 may include one or more hard disk drives as storage device 134. In other embodiments, storage device 134 is external to server computer device 301 and may be accessed by a plurality of server computer devices 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory areas 210 and 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 7:
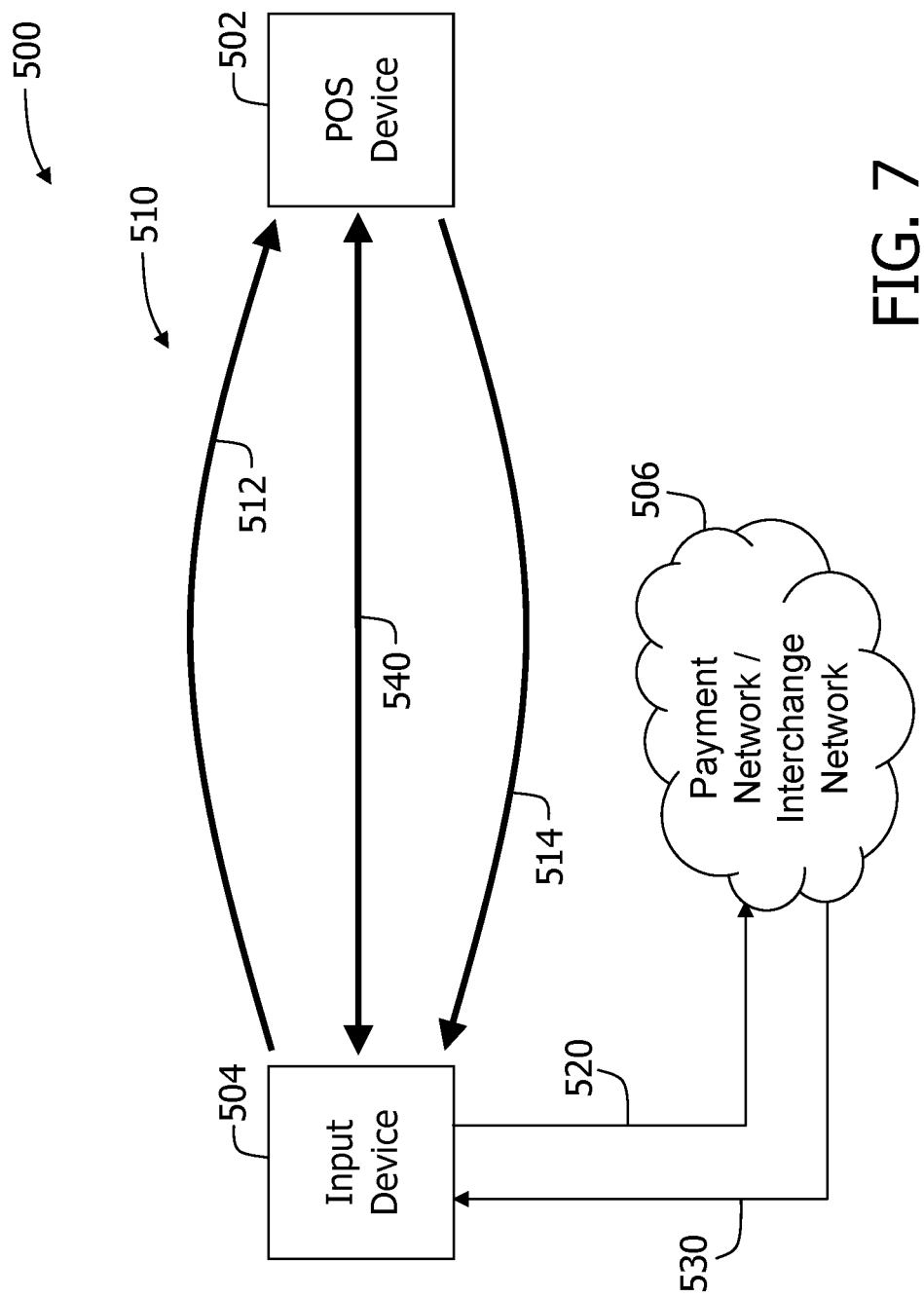
Figure 8:
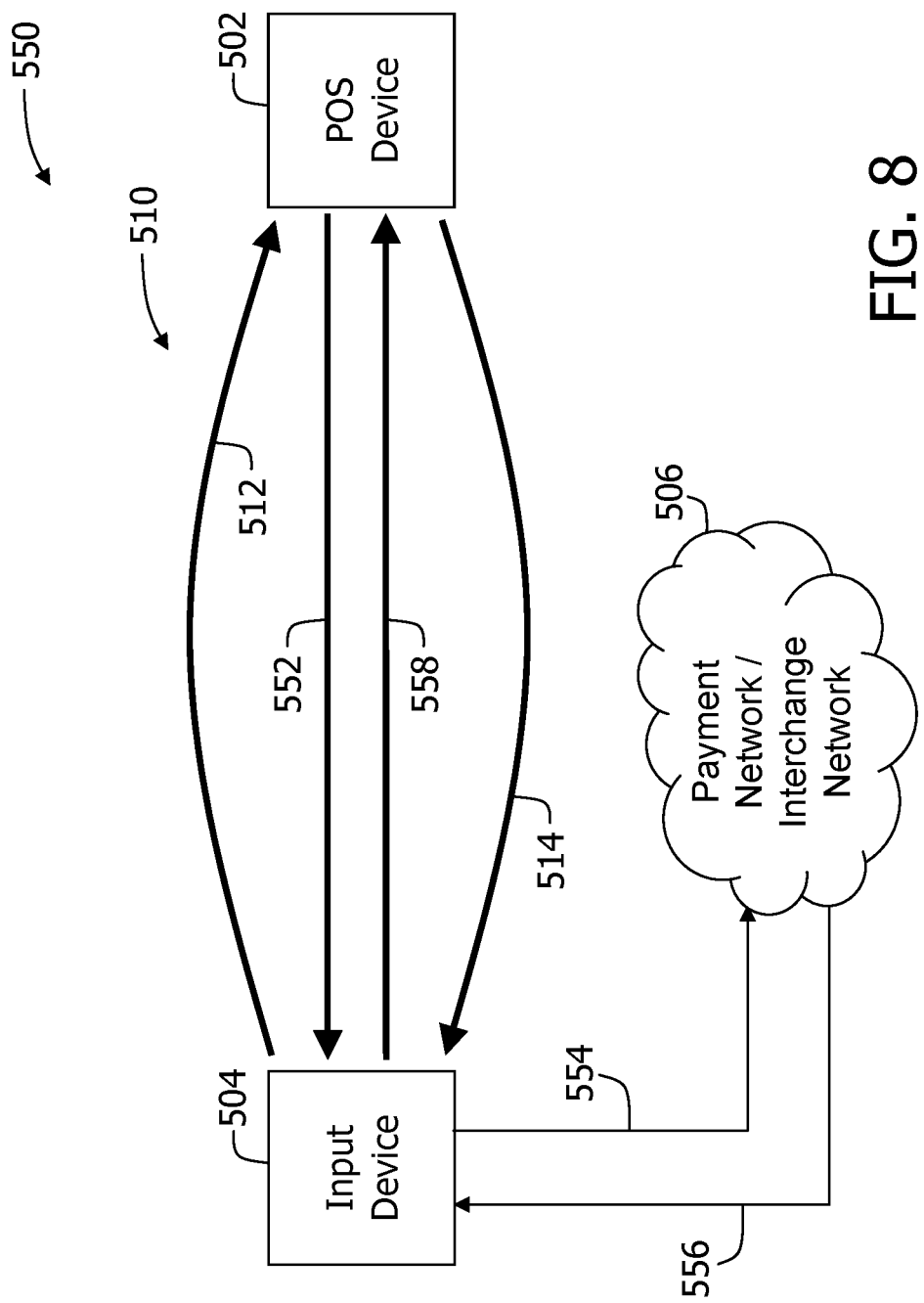
Figure 9:
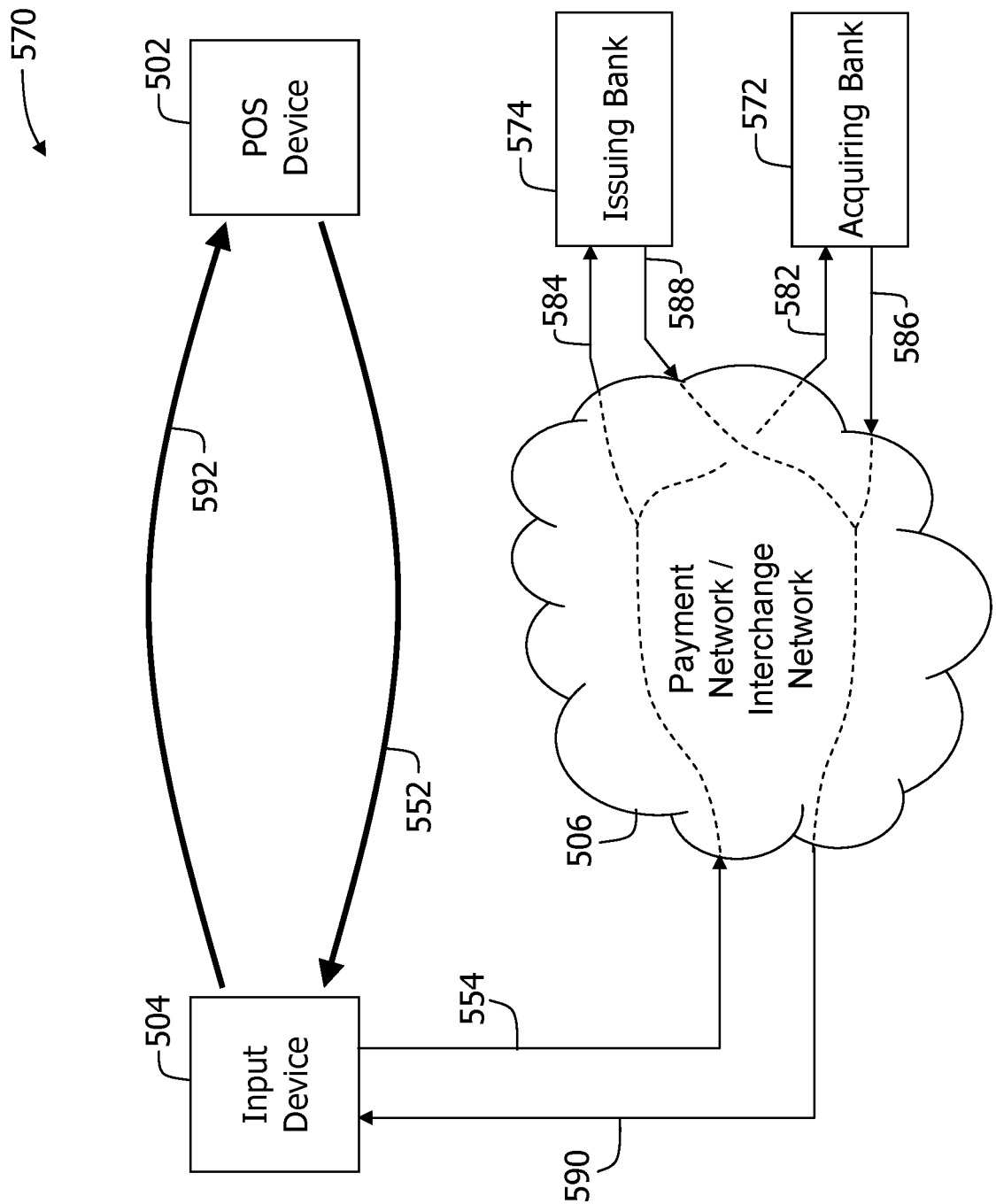

FIG. 7 is a block diagram of a portion of an exemplary payment card system 500 showing an authentication data flow between a merchant POS device 502, a cardholder input device 504, and a payment network 506. FIG. 8 is a block diagram of a portion of an exemplary payment card system 550 showing a first alternative authentication data flow between merchant POS device 502, cardholder input device 504, and payment network 506. FIG. 9 is a block diagram of an exemplary payment card system 570 showing a second alternative authentication data flow between merchant POS device 502, cardholder input device 504, payment network 506, an issuing bank 572, and an acquiring bank 574. Any of the data flows shown in FIGS. 7-9 may be used for authenticating a cardholder, and generating and sending an authorization request.

In the example embodiment and referring to FIGS. 3 and 7, merchant POS device 502 is similar to POS terminal 115, cardholder input device 504 is similar to cardholder input device 118, and payment network 506 is similar to at least one of client system 114 and server system 112. Payment network 506 is associated with any of an issuing bank, a merchant bank, an interchange network or any other third-party service provider.

When processing a payment-by-card transaction, input device 504 is authenticated 510 by merchant POS device 502. Authentication 510 is substantially the same process in both FIGS. 7 and 8 and may be used as part of a payment card system, as described below with reference to FIGS. 10-12.

Authentication process 510 occurs by cardholder input device 504 transmitting 512 account data to merchant POS device 502. In the example embodiment, input device 504 is associated with or controlled by a cardholder making a purchase using a payment card. The payment card is associated with an account. Input device 504 is interconnected to the Internet through many interfaces including a network, such as a local area network (LAN) or a wide area network (WAN), dial-in-connections, cable modems, wireless modems, and special high-speed ISDN lines. Input device 504 could be any device capable of interconnecting to the Internet including a web-based phone, personal digital assistant (PDA), or other web-based connectable equipment. Input device 504 is also configured to communicate with POS device 502 using various outputs including, for example, Bluetooth communication, radio frequency communication, near field communication, network-based communication, and the like. Input device 504 also includes account data stored within memory associated with input device 504. The account data includes at least one of a cardholder name, a cardholder address, an account number or other account identifier, an expiration date, and/or a security token, such as a cryptographic key. Input device 504 is configured to communicate or transmit at least a portion of the account data to POS device 502 for authentication purposes.

POS device 502 receives the account data from input device 504 and validates the account data. For example, POS device 502 may determine whether the account number conforms to a predefined account numbering scheme and/or whether the expiration date has passed. If POS device 502 successfully validates the account data, POS device 502 may then transmit 514 a confirming authorization message back to input device 504 confirming that POS device 502 recognizes input device 504 as an authentic and genuine payment card.

Cardholder input device 504 receives the confirming authorization message from POS device 502. Based at least in part on the received authorization message, input device 504 determines that POS device 502 is an authentic and genuine POS device registered with the appropriate payment card system. This completes authentication process 510.

In some embodiments, POS device 502 and input device 504 authenticate each other, such as by exchanging and validating cryptographic keys. For example, input device 504 may include a cryptographic key associated with input device 504 when transmitting 512 account data. POS device 502 may validate the key and include a cryptographic key associated with POS device 502 when transmitting 514 the authorization message.

In some embodiments, POS device 502 communicates with payment network 506 via input device 504, as described in FIG. 7. In such embodiments, input device 504 may be understood to act as a proxy or a gateway between POS device 502 and payment network 506. In other embodiments, input device 504 collects information from POS device 502 and is responsible for initiating communication with payment network 506, as described in FIG. 8.

Referring to FIG. 7, after authentication 510 is completed, POS device 502 "pairs" with input device 504, using the various outputs of input device 504, to initiate a communication link via the network capabilities of input device 504 with payment network 506. POS device 502 is then able to transmit 520 an authorization request message to payment network 506 using the network capabilities of input device 504. Payment network 506 processes the authorization request message and transmits 530 an authorization response message to POS device 502 using the same communication link, namely the network capabilities of input device 504. Since POS device 502 and input device 504 are paired in communication, input device 504 communicates 540 the authorization response message to POS device 502 with both such devices optionally being able to display at least a portion of the authorization response message. For example, POS device 502 and/or input device 504 may display an indication of whether the financial transaction related to the authorization response message is approved or declined. In one embodiment, a financial transaction is approved when data related to the transaction (e.g., transaction data, account data, and/or merchant data) is successfully validated and is declined when such data is unsuccessfully validated.

Referring to FIG. 8, after authentication 510 is completed, input device 504 is presented in proximity to POS device 502 such that an exchange of transaction data can occur between the two devices. Specifically, POS device 502 transmits 552 transaction data including at least a merchant identifier, and a transaction amount to input device 504. Input device 504 captures the transaction data and, using computer-readable instructions stored on input device 504, creates and transmits 554 an authorization request message to payment network 506. Payment network 506 processes the authorization request message and transmits 556 an authorization response message to input device 504 using the network capabilities of input device 504. After receiving the authorization response message, input device 504 can again be presented in proximity to POS device 502 such that the authorization response message can be transmitted 558 to POS device 502.

Referring to FIG. 9, in some embodiments, POS device 502 transmits 552 transaction information to input device 504, as described above with reference to FIG. 8. The transaction information includes merchant data corresponding to the merchant associated with POS device 502. For example, the merchant data may include a merchant identifier, a merchant name, a merchant address, and/or a cryptographic key associated with the merchant.

Input device 504 transmits 554 an authorization request message to payment network 506. The authorization request message includes at least a portion of the transaction data (e.g., including the merchant data, such as the cryptographic key associated with the merchant) and account data associated with input device 504. For example, the account data may include a cryptographic key associated with input device 504.

Payment network 506 receives the authorization request message and "splits" the authorization request message. More specifically, payment network 506 transmits 582 the authorization request message, or a merchant authentication request message that includes a portion of the authorization request message (e.g., the merchant data), to an acquiring bank 572 associated with the merchant. Payment network 506 also transmits 584 the authorization request message to an issuing bank 574 associated with the cardholder.

Acquiring bank 572 authenticates POS device 502 by validating the merchant data from the authorization request message or merchant authentication request message, and transmits 586 an authorization response message or a merchant authentication response message to payment network 506 indicating whether the validation was successful. For example, a positive response message may indicate a successful validation, and a declined response message may indicate an unsuccessful validation.

Issuing bank 574 authenticates input device 504 by validating the account data from the authorization request message. Issuing bank 574 also validates the payment-by-card transaction associated with the authorization request message. For example, issuing bank 574 may determine whether the cardholder has sufficient funds for the transaction. If the account data is successfully validated, and the cardholder has sufficient funds, issuing bank 574 transmits 588 an approved authorization response message. Otherwise, issuing bank 574 transmits 588 a declined authorization response message.

Payment network 506 receives the response messages from acquiring bank 572 and issuing bank 574. When both acquiring bank 572 and issuing bank 574 indicate a successful validation, payment network 506 transmits 590 an approved authorization response message to input device 504. If either or both of acquiring bank 572 and issuing bank 574 indicate an unsuccessful validation, payment network 506 transmits 590 a declined authorization response message to input device 504. Input device 504 receives the authorization response message from payment network 506 and transmits 592 the authorization response message to POS device 502. Such an embodiment facilitates authenticating POS device 502 and input device 504 even when the security of one or both of POS device 502 and input device 504 is compromised.

Figure 10:
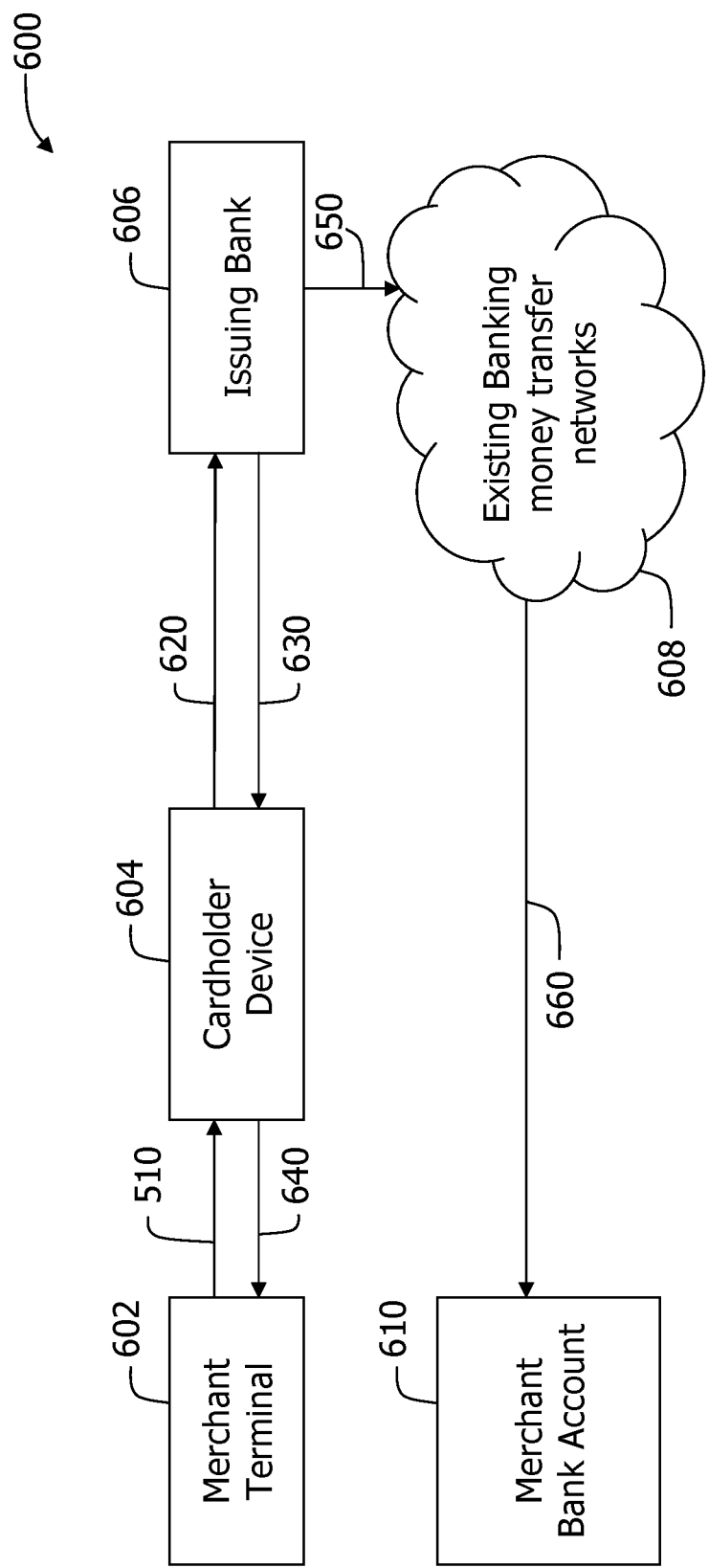

FIG. 10 is a more detailed block diagram of an exemplary payment card system 600 showing a payment data flow between a merchant POS device 602, a cardholder input device 604, an issuing bank computer system 606, a payment network 608, and a merchant bank account 610.

In the example embodiment and referring to FIGS. 3 and 10, merchant POS device 602 is similar to POS terminal 115, cardholder input device 604 is similar to cardholder input device 118, issuing bank computer system 606 and merchant bank account 610 are similar to client systems 114, and payment network 608 is similar to server system 112 or any other communication network for processing payments by transaction cards.

When processing a payment-by-card transaction using system 600, merchant POS device 602 and cardholder input device 604 initiate authentication process 510 as described in FIGS. 7 and 8. After authentication process 510 is performed, an authorization request message is created as described in FIGS. 7 and 8. Cardholder input device 604 transmits 620 the authorization request message, via the network capabilities of input device 604, directly to issuing bank computer system 606. Issuing bank computer system 606 validates the transaction, such as by determining by searching its database whether the cardholder has adequate funds to cover the transaction amount. Issuing bank computer system 606 then transmits 630 an authorization response message, via the network capabilities of input device 604, back to input device 604.

Cardholder input device 604 transmits 640 the authorization response message to merchant POS device 602. As explained above in FIG. 7, in one embodiment, POS device 602 is "paired" in communication with input device 604, using the various outputs of input device 604. This pairing allows cardholder input device 604 to transmit 640 the authorization response message to POS device 602 with both such devices being able to display the authorization response message. Alternatively, and as explained above in FIG. 8, in another embodiment, input device 604 is presented in proximity to POS device 602 such that an exchange of data can occur between the two devices. Specifically, cardholder input device 604 transmits 640 the authorization response message to POS device 602 with both such devices being able to display the authorization response message.

Settlement of the transaction amount must then occur within payment system 600. In the example embodiment, settlement occurs by issuing bank computer system 606 transmitting 650 settlement account data to payment network 608. In one embodiment, the settlement account data includes a settlement identifier for identifying the proper bank account of the merchant that the transaction funds are to be transferred to. The settlement identifier may be provided to issuing bank computer system 606 as part of the original authorization request message transmitted by cardholder input device 604 to issuing bank computer system 606.

In another embodiment, the settlement account data includes a merchant identifier, which it received as part of the original authorization request message transmitted by cardholder input device 604, to payment network 608. Payment network 608 includes a merchant database that stores information on each merchant including instructions for settling the transaction and a settlement identifier for the corresponding merchant. According, payment network 608 receives the merchant identifier from the issuing bank computer system 606, and performs a look up within the merchant database to find a settlement identifier corresponding to the merchant identifier.

Once payment network 608 has the settlement identifier for the transaction, network 608 is able to transmit 660 the settlement data, representing the settlement funds, to the appropriate merchant account 610 with the help of the acquiring bank. The appropriate merchant account is designated by the settlement identifier. The cardholder is eventually billed by the issuing bank for the transaction amount. This completes payment process 600 of a payment-by-card transaction.

Figure 11:
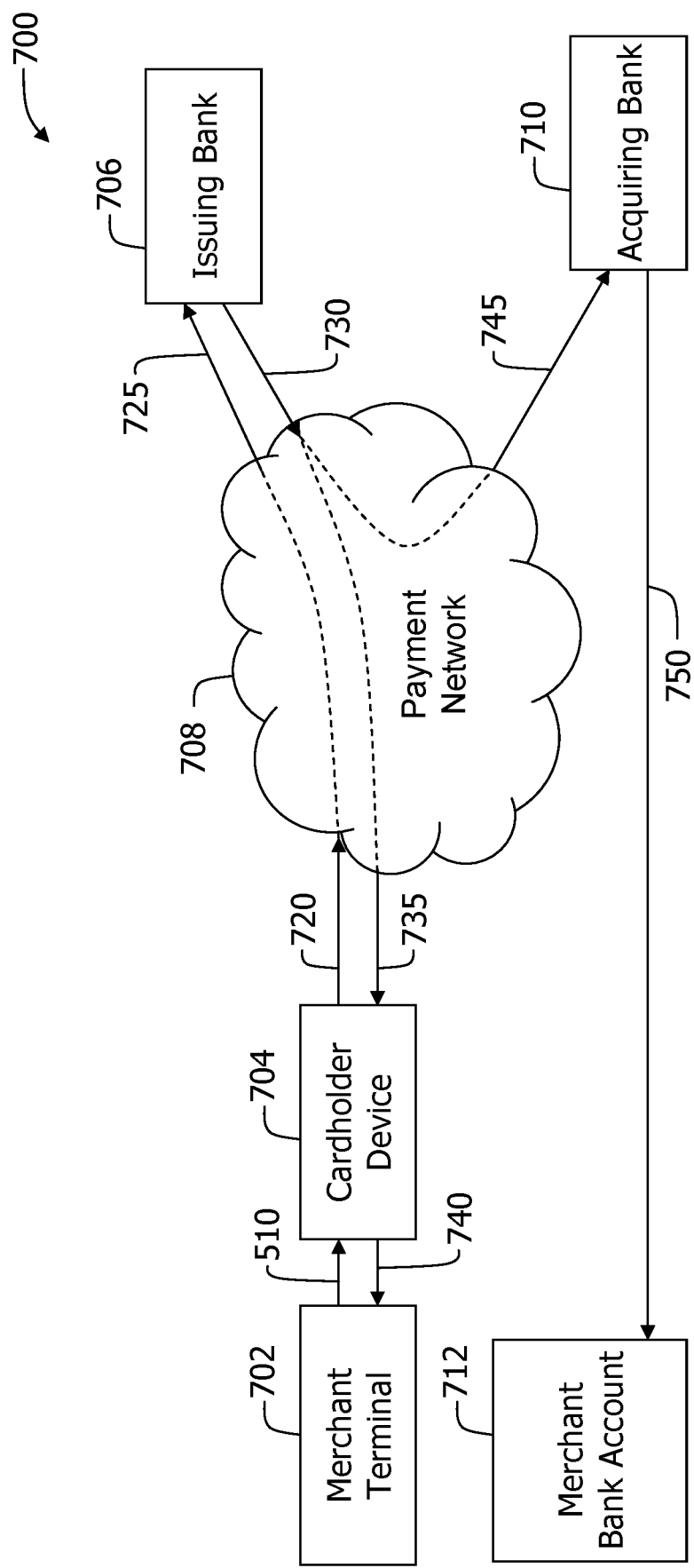

FIG. 11 is a more detailed block diagram of an exemplary payment card system 700 showing a first alternative payment data flow between a merchant POS device 702, a cardholder input device 704, an issuing bank computer system 706, a payment network 708, an acquiring bank computer system 710, and a merchant bank account 712.

In the example embodiment and referring to FIGS. 3 and 11, merchant POS device 702 is similar to POS terminal 115; cardholder input device 704 is similar to cardholder input device 118; issuing bank computer system 706, acquiring bank computer system 708 and merchant bank account 712 are similar to client systems 114; and payment network 708 is similar to server system 112 or any other communication network for processing payments by transaction cards such as an interchange network.

When processing a payment-by-card transaction using system 700, merchant POS device 702 and cardholder input device 704 initiate authentication process 510 as described in FIGS. 7 and 8. After authentication process 510 is performed, an authorization request message is created as described in FIGS. 7 and 8. Cardholder input device 704 transmits 720 the authorization request message, via the network capabilities of input device 704, to payment network 708. Payment network 708 processes the received authorization request message, and transmits 725 the authorization request message to issuing bank computer system 706. Issuing bank computer system 706 determines by searching its database whether the cardholder has adequate funds to cover the transaction amount. Issuing bank computer system 706 then transmits 730 an authorization response message back to payment network 708. Payment network 708 forwards 735 the authorization response message, via the network capabilities of input device 704, back to cardholder input device 704.

Cardholder input device 704 transmits 740 the authorization response message to merchant POS device 702. As explained above in FIG. 7, in one embodiment, POS device 702 is "paired" in communication with input device 704, using the various outputs of input device 704. This pairing allows cardholder input device 704 to transmit 740 the authorization response message to POS device 702 with both such devices being able to display the authorization response message. Alternatively, and as explained above in FIG. 8, in another embodiment, input device 704 is presented in proximity to POS device 702 such that an exchange of data can occur between the two devices. Specifically, cardholder input device 704 transmits 740 the authorization response message to POS device 702 with both such devices being able to display the authorization response message.

Settlement of the transaction amount must then occur within payment system 700. In the example embodiment, settlement occurs by payment network 708 transmitting 745 settlement account data to acquiring bank computer system 710. In the example embodiment, the settlement account data includes a merchant identifier, which payment network 708 received as part of the original authorization request message transmitted by cardholder input device 704. Thus, after payment network 708 receives an approved authorization response message from issuing bank computer system 706 for the transaction, payment network 708 is able to provide settlement account data to acquiring bank computer system 710. Acquiring bank computer system 710 uses the settlement account data including the merchant identifier to determine the appropriate merchant bank account to deposit the transaction funds in.

Once acquiring bank computer system 710 has the merchant identifier for the transaction, acquiring bank computer system 710 is able to transmit 750 settlement data, representing the settlement funds, to the appropriate merchant account 712. The appropriate merchant account is designated by the merchant identifier and the merchant account data stored at the acquiring bank. The cardholder is eventually billed by the issuing bank for the transaction amount. This completes payment process 700 of a payment-by-card transaction.

Figure 12:
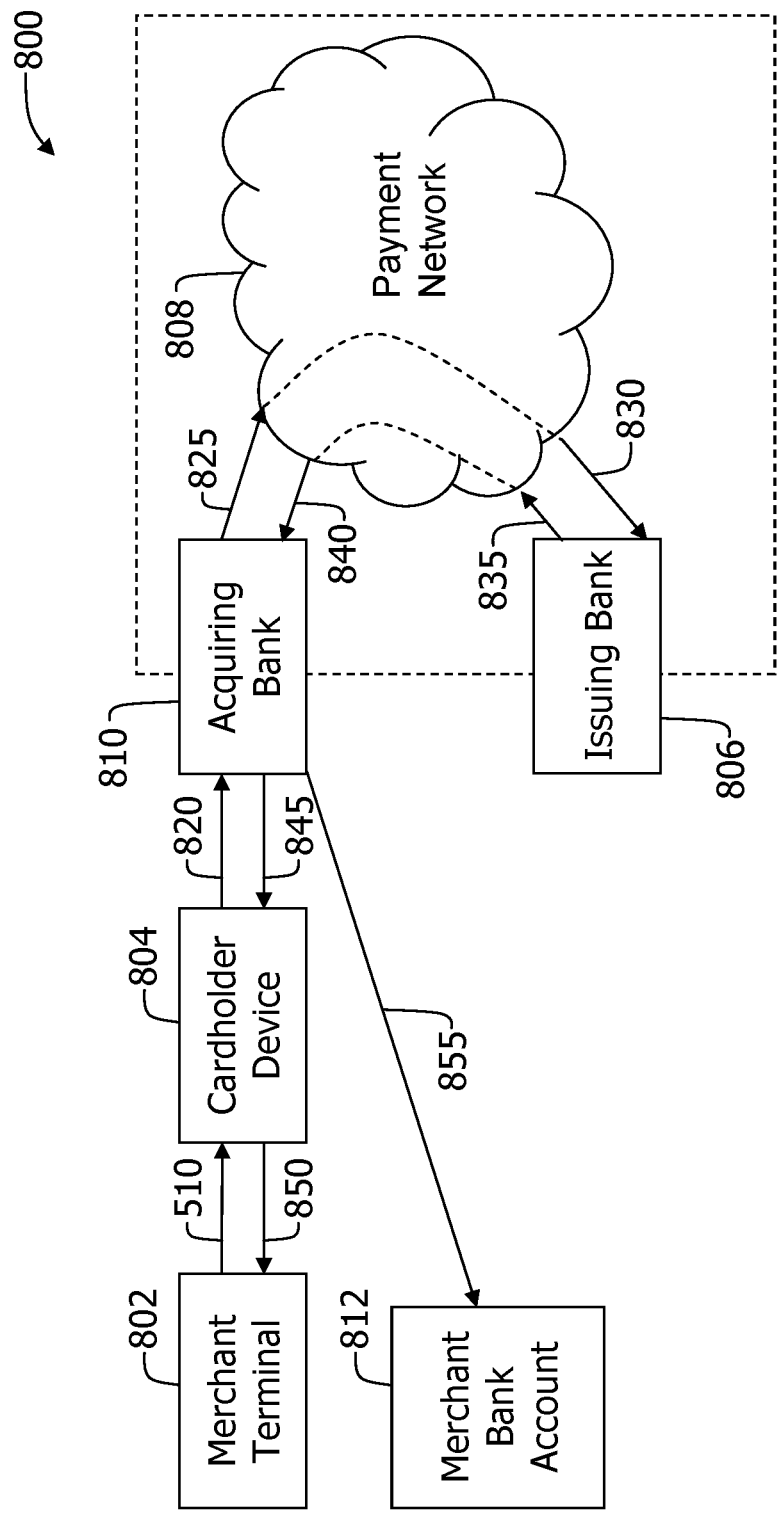

FIG. 12 is a more detailed block diagram of an exemplary payment card system 800 showing a second alternative payment data flow between a merchant POS device 802, a cardholder input device 804, an issuing bank computer system 806, a payment network 808, an acquiring bank computer system 810, and a merchant bank account 812.

In the example embodiment and referring to FIGS. 3 and 12, merchant POS device 802 is similar to POS terminal 115; cardholder input device 804 is similar to cardholder input device 118; issuing bank computer system 806, acquiring bank computer system 808 and merchant bank account 812 are similar to client systems 114; and payment network 808 is similar to server system 112 or any other communication network for processing payments by transaction cards such as an interchange network.

When processing a payment-by-card transaction using system 800, merchant POS device 802 and cardholder input device 804 initiate authentication process 510 as described in FIGS. 7 and 8. After authentication process 510 is performed, an authorization request message is created as described in FIGS. 7 and 8. Cardholder input device 804 transmits 820 the authorization request message, via the network capabilities of input device 804, to acquiring bank computer system 810. In the example embodiment, input device 804 receives an identifier from merchant POS device 802 that identifies the merchant's acquiring bank so that input device 804 is able to transmit 820 the authorization request message to acquiring bank computer system 810.

Acquiring bank computer system 810 then forwards 825 the received authorization request message to payment network 808. Payment network 808 processes the received authorization request message, and transmits 830 the authorization request message to issuing bank computer system 806. Issuing bank computer system 806 determines by searching its database whether the cardholder has adequate funds to cover the transaction amount. Issuing bank computer system 806 then transmits 835 an authorization response message back to payment network 808. Payment network 808 forwards 840 the authorization response message to acquiring bank computer system 810. Acquiring bank computer system 810 then transmits 845, via the network capabilities of input device 804, the authorization response message to cardholder input device 804.

Cardholder input device 804 transmits 850 the authorization response message to merchant POS device 802. As explained above in FIG. 7, in one embodiment, POS device 802 is "paired" in communication with input device 804, using the various outputs of input device 804. This pairing allows cardholder input device 804 to transmit 850 the authorization response message to POS device 802 with both such devices being able to display the authorization response message. Alternatively, and as explained above in FIG. 8, in another embodiment, input device 804 is presented in proximity to POS device 802 such that an exchange of data can occur between the two devices. Specifically, cardholder input device 804 transmits 850 the authorization response message to POS device 802 with both such devices being able to display the authorization response message.

Settlement of the transaction amount must then occur within payment system 800. In the example embodiment, settlement occurs after payment network 808 provides acquiring bank computer system 810 with the authorization response message. In the example embodiment, after payment network 808 receives an approved authorization response message from issuing bank computer system 806 for the transaction, payment network 808 is able to provide settlement data to acquiring bank computer system 810. Acquiring bank computer system 810 uses the settlement data including the merchant identifier to determine the appropriate merchant bank account to deposit the transaction funds in.

Once acquiring bank computer system 810 has the merchant identifier for the transaction, acquiring bank computer system 810 is able to transmit 855 settlement data, representing the settlement funds, to the appropriate merchant account 812. The appropriate merchant account is designated by the merchant identifier and the merchant account data stored at the acquiring bank. The cardholder is eventually billed by the issuing bank for the transaction amount. This completes payment process 800 of a payment-by-card transaction.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A computer-implemented method comprising:
   receiving, by a payment network computing device, an authorization request message for a payment transaction initiated by a cardholder with a merchant, the merchant having i) a merchant account with an acquiring bank that is a member of a payment network and ii) a merchant identifier registered with the payment network, the authorization request message transmitted by a mobile cardholder input device controlled by the cardholder via the Internet to the payment network computing device without a merchant point-of-sale (POS) device communicating with the payment network computing device and without the merchant POS device having access to an account identifier of the cardholder, wherein the authorization request message includes:
   the account identifier associated with a payment account of the cardholder,
   the account identifier used to initiate the payment transaction, and
   a transaction amount and merchant data associated with the merchant, the merchant data including at least one of the merchant identifier, a merchant name, a merchant address, and a merchant POS device cryptographic key, wherein the transaction amount and the merchant data are obtained by the mobile cardholder input device from the merchant POS device via an electronic pairing using a near field communication (NFC) protocol;
   transmitting the received authorization request message from the payment network computing device via the payment network to an issuer bank computing device associated with the payment account;
   generating, by the payment network computing device, a merchant validation request message by extracting at least the merchant data from the authorization request message;
   transmitting the generated merchant validation request message from the payment network computing device via the payment network to an acquiring bank computing device of the acquiring bank;
   receiving, from the issuer bank computing device via the payment network, an issuer validation response indicating that the issuer bank computing device has determined whether the payment account associated with the account identifier has sufficient funds for the transaction amount;
   receiving, from the acquiring bank computing device via the payment network, a merchant validation response indicating that the acquiring bank computing device has determined whether the merchant data provided in the merchant validation request message is valid;
   generating an authorization response message by the payment network computing device, wherein the authorization response message indicates that the payment transaction is one of:
   approved, in response to both i) the issuer validation response confirming sufficient funds and ii) the merchant validation response confirming the merchant data is valid; and
   declined, in response to at least one of iii) the issuer validation response not confirming sufficient funds and iv) the merchant validation response not confirming the merchant data is valid; and
   transmitting the authorization response message from the payment network computing device via the Internet to the mobile cardholder input device in lieu of transmission of the authorization response message to the merchant POS device.

2. A computer-based method according to claim 1, wherein the electronic pairing includes:
   transmitting payment account data to the merchant POS device, wherein the payment account data is associated with a payment card issued to the cardholder, and wherein the payment account data includes a cardholder input device cryptographic key;
   recognizing the merchant POS device cryptographic key embedded within the merchant data received from the merchant POS device; and
   authenticating the merchant POS device by validating the merchant POS device cryptographic key.

3. A computer-based method according to claim 1, wherein transmitting the authorization response message further comprises prompting, by the payment network computing device, the mobile cardholder input device to forward the authorization response message to the merchant POS device for completing the transaction.

4. A mobile cardholder input device controlled by a cardholder comprising:
   a memory device configured to store an account identifier associated with a payment account of the cardholder;
   a communication interface configured to communicate with a merchant point of sale (POS) device via a near field communication (NFC) protocol, and with a payment network computing device via the Internet; and
   a processor coupled to said memory device and said communication interface, said processor programmed to:
   receive, from the merchant POS device using the NFC protocol, a transaction amount associated with a payment transaction, and merchant data including at least one of a merchant identifier associated with the merchant, a merchant name, a merchant address, and a merchant POS device cryptographic key, the merchant having a merchant account with an acquiring bank that is a member of a payment network, the merchant identifier registered with the payment network;
   generate an authorization request message for the payment transaction, wherein the authorization request message includes the account identifier, the received transaction amount, and the merchant data;

transmit via the Internet the authorization request message to the payment network computing device via said communication interface; and wherein the payment network computing device is configured to: i) generate a merchant validation request message configured to request the acquiring bank to authenticate the merchant POS device by validating the merchant as associated with the acquiring bank, wherein the generating includes extracting at least the merchant data from the authorization request message, ii) transmit, via the payment network, the generated merchant validation request message to an acquiring bank computing device of the acquiring bank for validation, and iii) receive, from the acquiring bank computing device via the payment network, a merchant validation response indicating that the acquiring bank computing device has determined whether the merchant data provided in the merchant validation request message is valid;

wherein the payment network computing device is further configured to transmit, via the payment network, the authorization request message to an issuer bank computing device having an account associated with the cardholder for validation, and receive, from the issuer bank computing device via the payment network, an issuer validation response indicating that the issuer bank computing device has determined whether the payment account associated with the account identifier has sufficient funds for the transaction amount; and receive via the Internet an authorization response message from the payment network computing device in response to both the issuer validation response and the merchant validation response, wherein the authorization response message indicates that the payment transaction is one of:

approved, in response to both i) the issuer validation response confirming sufficient funds and ii) the merchant validation response confirming the merchant data is valid; and declined, in response to at least one of iii) the issuer validation response not confirming sufficient funds and iv) the merchant validation response not confirming the merchant data is valid.

5. A mobile cardholder input device according to claim 4, wherein the processor is further programmed to:

transmit payment account data to the merchant POS device, wherein the payment account data is associated with the payment card issued to the cardholder, and wherein the payment account data includes a cardholder input device cryptographic key;

recognize the merchant POS device cryptographic key embedded within the merchant data received from the merchant POS device; and authenticate the merchant POS device by validating the merchant POS device cryptographic key.

6. A mobile cardholder input device according to claim 4, wherein the processor is further programmed to:

transmit the authorization response message to the merchant POS device.

7. A mobile cardholder input device according to claim 6, wherein the authorization response message includes a decline authorization response message when at least one of the transaction data and the merchant data is not successfully validated.

8. A payment network computing device comprising:

a memory device for storing a plurality of data including payment account data, transaction data, and merchant data; and a processor configured to communicate with said memory device, said processor programmed to:

receive an authorization request message for a payment transaction initiated by a cardholder with a merchant, the merchant having i) a merchant account with an acquiring bank that is a member of a payment network and ii) a merchant identifier registered with the payment network, the authorization request message transmitted from a mobile cardholder input device controlled by the cardholder via the Internet to the payment network computing device without a merchant point-of-sale (POS) device communicating with the payment network computing device and without the merchant POS device having access to an account identifier of the cardholder, wherein the authorization request message includes:

the account identifier associated with a payment account of the cardholder, the account identifier used to initiate the payment transaction, and a transaction amount and merchant data associated with the merchant, the merchant data including at least one of the merchant identifier, a merchant name, a merchant address, and a merchant POS device cryptographic key, wherein the transaction amount and the merchant data are obtained by the mobile cardholder input device from the merchant POS device via an electronic pairing using a near field communication (NFC) protocol;

transmit the received authorization request message to an issuer bank computing device via the payment network associated with the payment account;

generate a merchant validation request message by extracting at least the merchant data from the authorization request message;

transmit the generated merchant validation request message via the payment network to an acquiring bank computing device of the acquiring bank;

receive, from the issuer bank computing device via the payment network, an issuer validation response indicating that the issuer bank computing device has determined whether the payment account associated with the account identifier has sufficient funds for the transaction amount;

receive, from the acquiring bank computing device via the payment network, a merchant validation response indicating that the acquiring bank computing device has determined whether the merchant data provided in the merchant validation request message is valid;

generating an authorization response message by the payment network computing device, wherein the authorization response message indicates that the payment transaction is one of:

approved, in response to both i) the issuer validation response confirming sufficient funds and ii) the merchant validation response confirming the merchant data is valid; and declined, in response to at least one of iii) the issuer validation response not confirming sufficient funds and iv) the merchant validation response not confirming the merchant data is valid; and transmit the authorization response message from the payment network computing device via the Internet to the mobile cardholder input device in lieu of transmission of the authorization response message to the merchant POS device.

9. A payment network computing device according to claim 8, wherein the electronic pairing includes:
   transmitting payment account data to the merchant POS device, wherein the payment account data is associated with the payment card issued to the cardholder, and wherein the payment account data includes a cardholder input device cryptographic key;
   recognizing the merchant POS device cryptographic key embedded within the merchant data received from the merchant POS device; and
   authenticating the merchant POS device by validating the merchant POS device cryptographic key.

10. A payment network computing device according to claim 8, wherein transmitting the authorization response message further comprises prompting, by the payment network computing device, the mobile cardholder input device to forward the authorization response message to the merchant POS device for completing the transaction.

11. One or more non-transitory computer-readable media having computer-executable instructions embodied thereon, wherein when executed by a payment network computing device, the computer-executable instructions cause the payment network computing device to:
   receive an authorization request message for a payment transaction initiated by a cardholder with a merchant, the merchant having i) a merchant account with an acquiring bank that is a member of a payment network and ii) a merchant identifier registered with the payment network, the authorization request message transmitted from a mobile cardholder input device controlled by the cardholder via the Internet to the payment network computing device of the payment network without a merchant point-of-sale (POS) device communicating with the payment network computing device and without the merchant POS device having access to an account identifier of the cardholder, wherein the authorization request message includes:
   the account identifier associated with a payment account of the cardholder, the account identifier used to initiate the payment transaction, and
   a transaction amount and merchant data associated with the merchant, the merchant data including at least one of the merchant identifier, a merchant name, a merchant address, and a merchant POS device cryptographic key, wherein the transaction amount and the merchant data are obtained by the mobile cardholder input device from the merchant POS device via an electronic pairing using a near field communication (NFC) protocol;
   transmit the received authorization request message via the payment network to an issuer bank computing device associated with the payment account;
   generate a merchant validation request message by extracting at least the merchant data from the authorization request message;
   transmit the generated merchant validation request message via the payment network to an acquiring bank computing device of the acquiring bank;
   receive, from the issuer bank computing device via the payment network, an issuer validation response indicating that the issuer bank computing device has determined whether the payment account associated with the account identifier has sufficient funds for the transaction amount;
   receive, from the acquiring bank computing device via the payment network, a merchant validation response indicating that the acquiring bank computing device has determined whether the merchant data provided in the merchant validation request message is valid;
   generating an authorization response message by the payment network computing device, wherein the authorization response message indicates that the payment transaction is one of:
   approved, in response to both i) the issuer validation response confirming sufficient funds and ii) the merchant validation response confirming the merchant data is valid; and
   declined, in response to at least one of iii) the issuer validation response not confirming sufficient funds and iv) the merchant validation response not confirming the merchant data is valid; and
   transmit the authorization response message from the payment network computing device via the Internet to the mobile cardholder input device in lieu of transmission of the authorization response message to the merchant POS device.

12. One or more non-transitory computer-readable media according to claim 11, wherein the electronic pairing includes:
   transmitting payment account data to the merchant POS device, wherein the payment account data is associated with a payment card issued to the cardholder, and wherein the payment account data includes a cardholder input device cryptographic key;
   recognizing the merchant POS device cryptographic key embedded within the merchant data received from the merchant POS device; and
   authenticating the merchant POS device by validating the merchant POS device cryptographic key.

13. One or more non-transitory computer-readable media according to claim 11, wherein transmitting the authorization response message further comprises prompting, by the payment network computing device, the mobile cardholder input device to forward the authorization response message to the merchant POS device for completing the transaction.

* * * * *